United States Patent [19]

Mihara et al.

[11] Patent Number: 4,924,220

[45] Date of Patent: May 8, 1990

[54] ARBITER CIRCUIT FOR PROCESSING CONCURRENT REQUESTS FOR ACCESS TO SHARED RESOURCES

[75] Inventors: Masaaki Mihara; Toshifumi Kobayashi, both of Hyogo, Japan

[73] Assignee: Mitsubishi Denki Kabushiki Kaisha, Tokyo, Japan

[21] Appl. No.: 286,922

[22] Filed: Nov. 18, 1988

[30] Foreign Application Priority Data

Nov. 19, 1987 [JP] Japan .............................. 62-292832

[51] Int. Cl.⁵ .............................................. H04Q 1/20
[52] U.S. Cl. ........................... 340/825.510; 340/825.5; 370/85.2; 307/597; 307/592
[58] Field of Search ........... 310/825.05, 825.5, 825.51; 307/269, 408, 518, 480, 243, 592, 597; 370/85.1, 85.2, 85.3; 375/36

[56] References Cited

U.S. PATENT DOCUMENTS

| | | | |
|---|---|---|---|
| 3,824,409 | 7/1974 | Patil | 340/825.5 |
| 4,249,093 | 2/1981 | Henig | 340/825.5 |
| 4,314,164 | 2/1982 | Tin et al. | 340/825.5 |
| 4,339,808 | 7/1982 | North | 340/825.5 |
| 4,423,384 | 12/1983 | DeBock | 340/825.51 |
| 4,612,542 | 8/1986 | Pantry et al. | 340/825.5 |
| 4,716,322 | 12/1987 | D'Arrigo et al. | 307/592 |
| 4,815,039 | 2/1989 | Tai et al. | 307/269 |

FOREIGN PATENT DOCUMENTS 0185370 6/1986 European Pat. Off. ......... 340/825.5

OTHER PUBLICATIONS

Davies, Mike, "An Inexpensive Asynchronous Priority System", 11/24/81, Design Focus, New Electronics, vol. 14, No. 23, p. 23.
T. Sakurai et al., "A 36ns 1Mbit Pseudo SRAM with VSRAM Mode" 1987 Symposium on VLSI Circuits, Digest of Technical Papers, IEEE Cat. No. 87 TH0190-9, May 22,23, 1987.

*Primary Examiner*—Donald J. Yusko
*Assistant Examiner*—Eric O. Pudpud
*Attorney, Agent, or Firm*—Lowe, Price, Leblanc, Becker & Shur

[57] ABSTRACT

An arbiter circuit is disclosed for processing competing requests for access to a shared resource made simultaneously by two subsystems in a multi-processor system. The arbiter circuit includes an SR flip-flop composed of a pair of NAND gates, and functions to block the passage of a subsequent request signal from one subsystem to the SR flip-flop during a predetermined time interval after a request signal from the other subsystem has been supplied to the flip-flop. A result is that the both inputs of the SR flip-flop are not shifted up from the low levels to the high levels at the same time by the simultaneous generation of request signals from both subsystems, thereby eliminating any possibility of the output from the flip-flop floating at an intermediate level between the high and low level.

6 Claims, 4 Drawing Sheets

ARBITER CIRCUIT FOR PROCESSING CONCURRENT REQUESTS FOR ACCESS TO SHARED RESOURCES

BACKGROUND OF THE INVENTION

1. Field of the Invention

This invention generally relates to an arbiter circuit, and in particular to an arbiter circuit for processing concurrent requests made at random times by a plurality of digital subsystems for the use of shared resources.

2. Description of the Prior Art

In a multiple system such as a multiprocessor system, a plurality of subsystems, for example, central processing units which operate independently of one another share some resources such as a disc storage device, demands for the use of the shared resources are made at random times, often concurrently, by the sharing subsystems, making it necessary to process those concurrent requests. For example, one subsystem may make a request for the permission to use the shared resource when it is currently being accessed by another subsystem. In this situation, the late-to-come demand must be temporarily suspended until the current subsystem has completed its use of the shared resource. The arbiter circuit is one typical device for processing the coexisting demands, and is disclosed, for example, in an article by T. Sakurai et al entitled, "A 36ns 1 Mbit Pseudo SRAM with VSRAM Mode." (Digest of Technical Papers for the 1987 Symposium on VLSI Circuits, May 22, 1987, pp. 45)

In order to have a brief background understanding of the invention, reference is made to FIG. 1 which illustrates in block diagram a prior-art arbiter circuit. Digital subsystems $1a$ and $1b$ in a multiprocessor system operate independently of each other with no operative interrelations, and hence generate at random times request signals REQ-A and REQ-B for demanding the use of a shared resource 3 in the form of a disc storage device. The request signals REQ-A and REQ-B are supplied to an arbiter circuit 2, which in turn provides an acknowledgement signal $\overline{\text{ACK-A}}$ or another acknowledgement signal $\overline{\text{ACK-B}}$ to the shared resource 3, the $\overline{\text{ACK-A}}$ signal indicating the request by the REQ-A signal has been acknowledged, whereas the $\overline{\text{ACK-B}}$ signal representing the request by the REQ-B signal has been granted.

To state in more detail, the arbiter circuit 2 includes a first NAND gate $2a$ which is supplied with the REQ-A signal and $\overline{\text{ACK-B}}$ signal, and produces the $\overline{\text{ACK-A}}$ signal. Also included in the arbiter circuit 2 is a second NAND gate $2b$ which is supplied with the REQ-B signal and the $\overline{\text{ACK-A}}$ signal, and operates to generate the $\overline{\text{ACK-B}}$ signal. In essence, the arbiter circuit 2 is an SR flip-flop composed of the first and second NAND gates $2a$ and $2b$.

Now, the operation of the arbiter circuit of FIG. 1 is described with reference to FIG. 2 which shows a series of waveforms as they appear at various points in the circuit.

Under an operating situation where both the subsystem $1a$ and the subsystem $1b$ are silent on the demand for access to the shared resource with the request signals REQ-A and REQ-B being at "L" level, one input of the first NAND gate $2a$ to be supplied with the REQ-A signal is kept at the "L" level, and the output signal $\overline{\text{ACK-A}}$ of the same NAND gate takes on a high or "H" level regardless of the signal level or state the $\overline{\text{ACK-B}}$ signal assumed at the output of the second NAND gate $2b$, and thus at the other input of the first NAND gate $2a$. With the REQ-B signal at one input of the second NAND gate $2b$ also being at the "L" level, the $\overline{\text{ACK-B}}$ signal at the output of the second NAND gate $2b$ is at the "H" level regardless of the level which the $\overline{\text{ACK-A}}$ signal at the other input of the second NAND gate takes. The request acknowledgement signals $\overline{\text{ACK-A}}$ and $\overline{\text{ACK-B}}$ are low-level acting, the presence of the high-level acknowledgement signals $\overline{\text{ACK-A}}$ and $\overline{\text{ACK-B}}$ at time $t_0$ in FIG. 2 indicates that the arbiter circuit 2 fails to acknowledge any request for the use of the shared resource by the REQ-A and REQ-B signals.

At time $t_1$ when the subsystem $1a$ presents the request for permission to use the shared resource 3 while the subsystem $1b$ is silent on a similar request, one request signal REQ-A shifts to the high logic level or state, whereas the other request signal REQ-B remains at the low logic level. Under the conditions, both inputs of the first NAND gate $2a$ are applied with high-level signals, causing the NAND gate $2a$ to generate a low-level acknowledgement signal $\overline{\text{ACK-A}}$ at its output. This indicates that the request made by the signal REQ-A has been granted. Meanwhile, with a low-level REQ-B signal being applied to its one input, the second NAND gate $2b$ provides a high-level $\overline{\text{ACK-B}}$ signal at its output, indicating that no request is acknowledged by the second NAND gate $2b$. When the subsystem $1a$ is through with the use of the shared resource, the request signal REQ-A falls back to its low logic level, followed instantly by the $\overline{\text{ACK-A}}$ signal returning to its high logic level.

Further, at time $t_2$ when the subsystem $1b$ makes a request for permission to use the shared resource 3 with the other subsystem $1a$ silent on such request, the request signal REQ-B for the subsystem $1b$ changes from the low logic level to the high logic level, while the request signal REQ-A for the subsystem $1a$ stays at the low logic level. Under the conditions, the second NAND gate $2b$ has high-level signals applied to both its inputs, and thus produces a low-level $\overline{\text{ACK-B}}$ signal at the output, indicating that the request by the REQ-B signal has been acknowledged. On the other hand, the first NAND gate $2a$, with the low-level REQ-A signal being supplied at one input, generates a high-level $\overline{\text{ACK-A}}$ signal at the output, representing the absence of a request from the subsystem $1a$. Upon the completion of the use of the shared resource by the subsystem $1b$, the request signal REQ-B shifts back to the low logic level accompanied by the $\overline{\text{ACK-B}}$ signal returning to the high logic level or state.

Now to consider a situation where two requests are made in a time-staggered manner. At time $t_3$, the subsystem $1a$ produces a high-level request signal REQ-A asking for access to the shared resource 3, upon the receipt of which the first NAND gate $2a$ provides a low-level $\overline{\text{ACK-A}}$ signal to grant the request. Subsequent to the first request by the subsystem $1a$, the subsystem $1b$ issues a second request for the use of the same shared resource 3 by providing a high-level REQ-B signal to the one input of the second NAND gate $2b$ at time $t_4$. It is noted that, at this point, the second NAND gate $2b$ is being supplied at the other input with the low-level $\overline{\text{ACK-A}}$ signal from the output of the first NAND gate $2a$. Thus, the application of the second high-level request signal REQ-B to the second NAND gate 2b in no way affects the ACK-B signal currently in its high logic state at the output of the second NAND gate. With the ACK-B signal at the high logic level, the second NAND gate 2b does not accept the second request made by the subsystem 1b.

When the subsystem 1a vacates the shared resource 3 at time $t_5$, the request signal REQ-A shifts down to the low logic level, causing the ACK-A signal at the output of the first NAND gate 2a to return to the high logic level. The request by the subsystem 1a is thus negated. The other request made by the subsystem 1b is still valid with the high level REQ-B signal applied to the one input of the second NAND gate, the emergence of the high-level ACK-B signal at the output of the first NAND gate 2a applies another high-level signal to the other input of the second NAND gate 2b. As a result, the ACK-B signal at the output of the second NAND gate shifts to the low logic level to put the request by the signal REQ-B into effect. When this request by the subsystem 1b is brought to an end, the ACK-B signal again moves back to the high logic level as before.

In short, if the subsystem 1a and 1b make individual requests for access to the shared resource 3 at different points of time, the arbiter circuit 2 functions to accept the earlier request into effect, while suspending the later request until the earlier one has been fully implemented.

However, the prior-art arbiter circuit of FIG. 1 is incapable of coping with two concurrent requests made by both subsystem 1a and 1b at a time. Now to consider a case where the request signals REQ-A and REQ-B are simultaneously shifted from the low level to the high level at time $t_6$, just prior to this time when both signals REQ-A and REQ-B are at the low levels, the acknowledgement signals ACK-A and ACK-B are in their high logic state. Under the circumstances, the simultaneous shifting of the REQ-A and REQ-B signals into the high logic states drives the ACK-A output of the first NAND gate 2a into the low level on one hand since the first NAND gate has been supplied with the high level ACK-B signal at the one input. It also drives the ACK-B output signal of the second NAND gate 2b toward the low logic level because the second NAND gate has been supplied with the high-level ACK-A signal at the one input. Since the arbiter circuit 2 is essentially an SR flip-flop, the simultaneous application of the high level signals REQ-A and REQ-B to the arbiter circuit leads to the generation of the ACK-A and ACK-B output signals with the opposite logic levels. Consequently, the ACK-A and ACK-B signals which are shifting from the high level to the low level counter act with each other to drive the other signal toward the high level. The overall result is that both the ACK-A signal and the ACK-B signal are forced to "stay afloat" midway between the high and low logic levels. With the acknowledgement signals midway between the prescribed logic levels or states, there are good chances that the arbiter circuit is unable to process the concurrent demands and neither of the requesting subsystems are denied access to the shared resource. This in turn may contribute to an undesirable consequence of faulty operation in the multiprocessing system.

SUMMARY OF THE INVENTION

Therefore, it is an object of the present invention to provide an arbiter circuit capable of effectively processing competing requests for access to a shared resource made by a plurality of subsystems.

It is another object of the present invention to provide an improved arbiter circuit capable of accepting any of the requests for access to a shared resource made simultaneously by a plurality of subsystems.

Briefly stated, an arbiter circuit according to the invention includes: a first control unit operable in response to an externally supplied first request signal to control the point of time when the first request signal is to be activated; a second control unit operable in response to an externally applied second request signal to control the point of time when the applied second request signal is to be activated; and an SR flip-flop unit operable to provide first and second acknowledgement signals in response to the first and second request signals from the first and second control units. The second control unit comprises a first delay unit for delaying the activation of the second request signal for a predetermined first delay time, and a second delay unit for supplying to the first control unit a signal which defines a predetermined second delay time longer than the first predetermined delay time. The first control unit includes a delay unit operable in response to the signal defining the second delay time to delay the activation of the first request signal for the period of the second delay time.

In accordance with a major operating feature of the arbiter circuit embodying the invention, the activated first request signal is not transmitted to the input of the SR flip-flop during the predetermined time interval after the second request signal has been activated with only the activated second request signal being supplied to the flip-flop input during the same time interval. This eliminates any possibility of the two separate inputs to the SR flip-flop being shifted up at the same time by the simultaneous application of the requests for access to the shared resource from the subsystems, which in turn effectively avoids undesirable operating conditions where the floating first and second acknowledgement signals make it impossible for the arbiter circuit to process the competing simultaneous requests for access to the shared resource.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
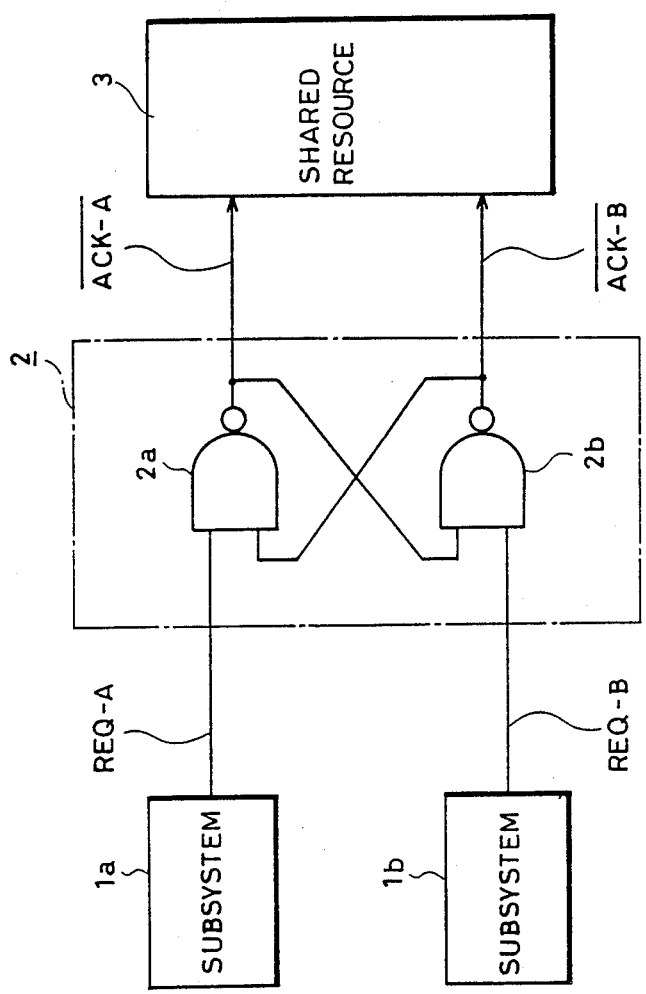
FIG. 1 is a block diagram showing a general arrangement of a prior-art arbiter circuit.
Figure 2:
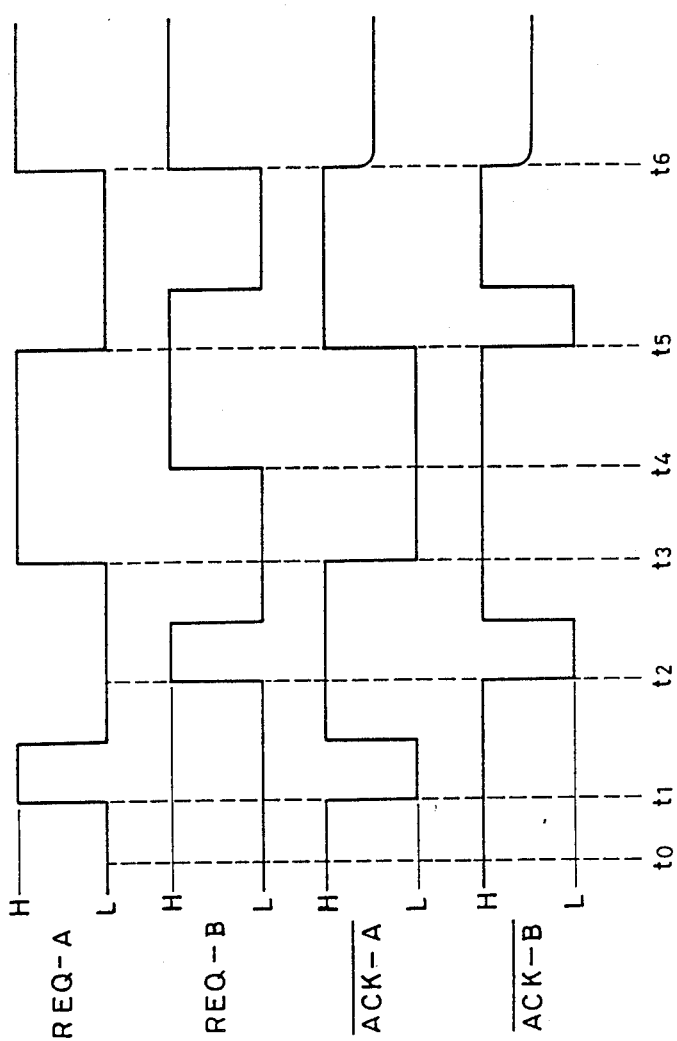
FIG. 2 is a timing diagram showing a series of waveforms that appear at various points in the arbiter circuit of FIG. 1.
Figure 3:
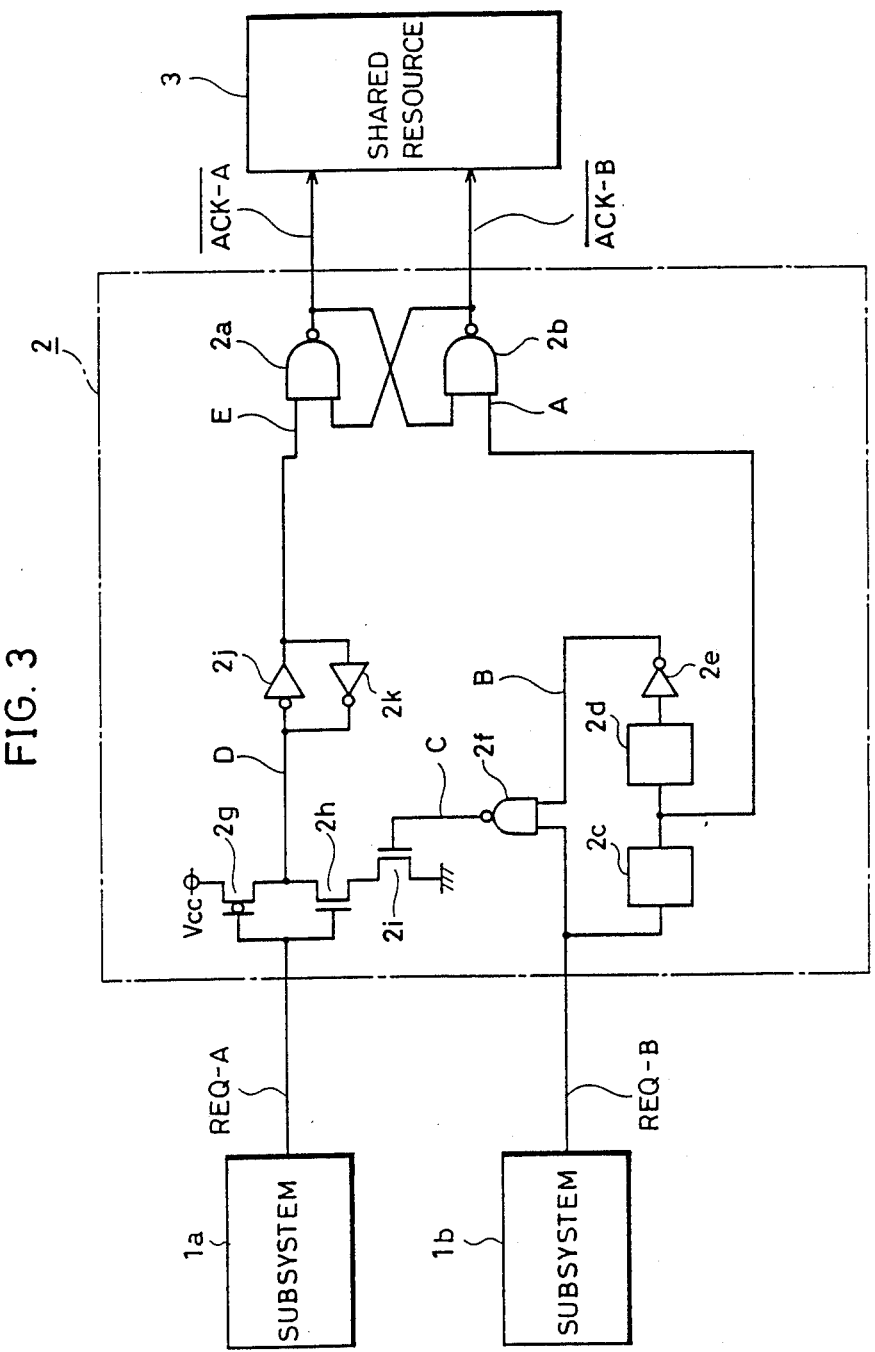
FIG. 3 is a block diagram showing a general arrangement of an arbiter circuit according to a preferred embodiment of the invention.

Referring now to FIG. 3, there is illustrated an arbiter circuit according to a preferred embodiment of the present invention. The arbiter circuit of FIG. 3 is basically identical in construction to the one shown in FIG. 1 except for several additional component parts incorporated therein. Accordingly, the following description centers on their functions as well as arrangements. In the arbiter circuit 2, there are provided in series with each other delay circuits 2c and 2d for delaying the request signal REQ-B generated by one subsystem 1b. The delay circuit 2C provides a delay time of $t_a$, whereas the delay circuit 2d provides a delay time of $t_b$. A delay signal from the delay circuit 2c is supplied to one input of the NAND circuit 2b and a delay signal from the delay circuit 2d is applied to one input of the NAND gate 2f after being inverted by an inverter 2e. The other input of the NAND gate 2f is fed with the REQ-B signal directly from the subsystem 1b.

On the other hand, a subsystem 1a supplies a request signal REQ-A to the control terminals of a pair of a p-channel transistor 2g and an n-channel transistor 2h which are coupled in a complementary circuit connection. An n-channel transistor 2i is inserted between one conducting terminal of the n-channel transistor 2h and ground potential, and has its control terminal connected to the output of the NAND gate 2f. The p-channel transistor 2g has one conducting terminal coupled to a voltage source Vcc and the other conducting terminal to the remaining conducting terminal of the n-channel transistor 2h. Those conducting terminals of the transistors 2h and 2g which are tied together are linked to one input of a NAND gate 2a via a latch circuit composed of a pair of inverters 2j and 2k.

Figure 4:
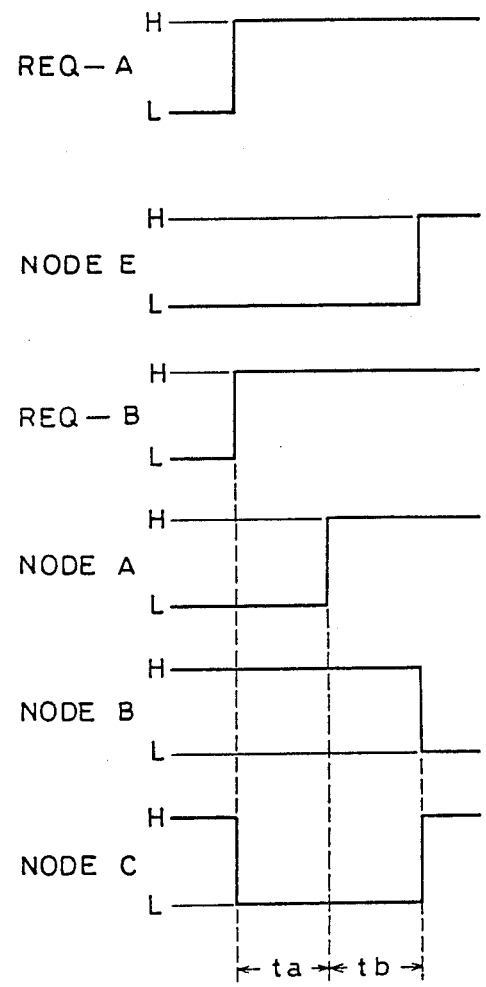
FIG. 4 is a waveform chart for the circuit of FIG. 3.

Now the operation of the arbiter circuit 2 is described with reference to FIG. 4 which shows a series of waveforms that appear in various points in the circuit.

When the subsystem 1b makes a request for access to a shared resource 3, the REQ-B signal shifts from the "L" level to the "H" level, causing the output of the delay circuit 2c, thus the potential level on node A to change to the "H" level with a time delay of $t_a$. The output of the delay circuit 2d is shifted to the "H" level with an additional delay of $t_b$. Thus, the potential level on node B shifts from the "H" level down to the "L" level upon the lapse of a combined delay time $t_a+t_b$ after the request signal REQ-B has been triggered into the "H" level. This in turn causes the output of the NAND gate 2f which is supplied both with the REQ-B signal and with the potential at node B, thus the potential level on node C to be kept at the "L" level for the period of time $t_a+t_b$ after the request signal REQ-B has been shifted to the "H" level. As a result, the n-channel transistor 2i stays non-conducting through this period.

It is also noted that during the period of time $t_a+t_b$ if the subsystem 1a generates a low-level request signal REQ-A, then the p-channel transistor 2g conducts to bring the potential value on node D to the "H" level, which in turn brings the potential on node E down to the "L" level.

While on the other hand, if the request signal REQ-A is shifted to the "H" level by the subsystem 1a simultaneously with the request signal REQ-B, and if it is held at the high level during the time $t_a+t_b$, the p-channel transistor 2g is kept non-conducting with the n-channel transistor 2i also non-conducting. Consequently, the potential on node D stays at the "H" level which is afforded by the pair of inverters 2j and 2k in latch circuit configuration. This leads to the potential on node E being "fixed" to the "L" level until the end of time period $t_a+t_b$ after the REQ-B signal has been shifted from the "L" level to the "H" level. Upon the passage of the delay time $t_a+t_b$, the n-channel transistor 2i conducts to bring the potential on node D down to the low level with an accompanying shift of the potential on node E up to the "H" level.

A distinguished operating feature of the arbiter circuit illustrated in FIG. 3 is that the shift-up of the request signal REQ-A from the "L" level to the "H" level is kept electrically isolated from the input of the NAND gate 2a during the time interval of $t_a+t_b$ after the point of time when the REQ-B signal has shifted from the "L" level to the "H" level, while the shift-up of the REQ-B signal is allowed to be transmitted to one input of the NAND gate 2b upon the passage of the delay time $t_a$. With this unique operating feature, the arbiter circuit 2 effectively prevents the input levels of both NAND gates 2a and 2b from being shifted up toward the high value by the simultaneous requests for access to a shared resource from the two subsystems. Consequently, there is no possibility that the acknowledgement signals $\overline{ACK-A}$ and $\overline{ACK-B}$ are kept floating at an intermediated level between the high and low levels, making it impossible for the arbiter circuit to process the competing requests for access to the shared resource.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An arbiter circuit comprising:
   first control means operative in response to an externally supplied first request signal to control the point of time when said first request signal is to be activated;
   second control means operative in response to an externally applied second request signal to control the point of time when said second request signal is to be activated; and
   SR flip-flop means operative in response to said first and second activated request signals supplied from said first and second control means to provide first and second acknowledgement signals;
   said second control means comprising means for delaying the activation of said second request signal for a predetermined first delay time, and
   means for providing to said first control means a signal for defining a second predetermined delay time longer than said first predetermined delay time,
   said first control means comprising means operable in response to said signal for defining said second predetermined delay time to delay the activation of said first request signal until said second predetermined delay time has lapsed.

2. An arbiter circuit according to claim 1, wherein said SR flip-flop means comprises first and second gate means,
   said first gate means being supplied with said first request signal and an output from said second gate means, and
   said second gate means being supplied with said second request signal and an output from said first gate means.

3. An arbiter circuit according to claim 2, wherein said first control means comprises latch means for holding only said first request signal in an unactivated state if said first request signal is activated during said second predetermined delay time.

4. An arbiter circuit according to claim 3, wherein said first control means comprises:

first voltage means for supplying a potential of an activated level;

second voltage means for supplying a potential of an un-activated level;

a first transistor device of one polarity having a first conducting terminal coupled to said first voltage means, a second conducting terminal, and a control terminal connected to be supplied with said first request signal;

a second transistor device of second polarity having a first conducting terminal, a second conducting terminal coupled to said second conducting terminal of said first transistor device, and a control terminal connected to receive said first request signal; and a third transistor device of second polarity having a first conducting terminal coupled to said second voltage means, a second conducting terminal connected to said first conducting terminal of said second transistor device, and a control terminal connected to be supplied with said signal for defining said second predetermined delay time from said second control means, said second conducting terminal of said first transistor device and said second conducting terminal of said second transistor device being coupled to said latch means.

5. An arbiter circuit according to claim 1, wherein said first control means comprises:

first voltage means for supplying a potential of an activated level;

second voltage means for supplying a potential of an unactivated level;

a first transistor device of one polarity having a first conducting terminal coupled to said first voltage means, a second conducting terminal, and a control terminal connected to be supplied with said first request signal;

a second transistor device of second polarity having a first conducting terminal, a second conducting terminal coupled to said second conducting terminal of said first transistor device, and a control terminal connected to receive said first request signal; and a third transistor device of second polarity having a first conducting terminal coupled to said second voltage means, a second conducting terminal connected to said first conducting terminal of said second transistor device, and a control terminal connected to be supplied with said signal for defining said second predetermined delay time from said second control means, said second conducting terminal of said first transistor device and said second conducting terminal of said second transistor device being coupled to said latch means.

6. An arbiter circuit comprising:

first control means operative in response to an externally supplied first request signal to control the point of time when said first request signal is to be activated;

second control means operative in response to an externally applied second request signal to control the point of time when said second request signal is to be activated; and SR flip-flop means operative in response to said first and second activated request signals supplied from said first and second control means to provide first and second acknowledgement signals;

said second control means comprising eliminating means for eliminating floating of said first and second acknowledgement signals at an intermediate level by preventing input levels of a pair of gates forming said SR flip-flop from being shifted by simultaneous requests for access to a shared resource, said control means further comprising means for delaying the activation of said second request signal for a predetermined first delay time, and means for providing to said first control means a signal for defining a second predetermined delay time longer than said first predetermined delay time, said first control means comprising means operable in response to said signal for defining said second predetermined delay time to delay the activation of said first request signal until said second predetermined delay time has lapsed.

* * * * *